(12) United States Patent
Shaw et al.

(10) Patent No.: US 11,050,845 B2
(45) Date of Patent: Jun. 29, 2021

(54) METHOD AND APPARATUS FOR PROVIDING CONFIGURABLE EVENT CONTENT

(71) Applicant: AT&T INTELLECTUAL PROPERTY I, LP, Atlanta, GA (US)

(72) Inventors: Venson Shaw, Kirkland, WA (US); Sangar Dowlatkhah, Alpharetta, GA (US); Zhi Cui, Sugar Hill, GA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 731 days.

(21) Appl. No.: 15/053,725

(22) Filed: Feb. 25, 2016

(65) Prior Publication Data

US 2017/0251078 A1    Aug. 31, 2017

(51) Int. Cl.
*H04L 29/08* (2006.01)
*H04L 29/06* (2006.01)

(52) U.S. Cl.
CPC ............ *H04L 67/34* (2013.01); *H04L 65/601* (2013.01); *H04L 67/26* (2013.01); *H04L 67/306* (2013.01)

(58) Field of Classification Search
CPC ....... H04L 67/34; H04L 65/601; H04L 67/26; H04L 67/306
See application file for complete search history.

(56) References Cited

U.S. PATENT DOCUMENTS

| 6,681,398 B1 | 1/2004 | Verna |
| 7,448,063 B2 * | 11/2008 | Freeman ................. G03C 1/26 348/157 |
| 7,454,615 B2 | 11/2008 | O'Neil et al. |
| 7,562,117 B2 * | 7/2009 | Rosenberg ........... G06Q 20/102 705/40 |

(Continued)

FOREIGN PATENT DOCUMENTS

| EP | 2403236 A1 | 1/2012 |
| WO | 2011143342 A1 | 11/2011 |
| WO | 2014093668 A1 | 6/2014 |

OTHER PUBLICATIONS

"More Camera Angles, More Choice—You Call the Shots in Today's Sports Viewing World", LostRemote, adweek.com, Sep. 10, 2014.

(Continued)

*Primary Examiner* — Lance Leonard Barry
*Assistant Examiner* — Timothy Sowa
(74) *Attorney, Agent, or Firm* — Guntin & Gust, PLC; Mark Wilinski

(57) ABSTRACT

Aspects of the subject disclosure may include, for example, partitioning content of a plurality of media streams into media segments to generate a plurality of media segments associated with a media event, determining a first set of media segments from the plurality of media segments according to social media information associated with a social media group, transmitting the first set of media segments to first user equipment of a first member of the (Continued)

social media group, detecting a change in membership of the social media group, updating the first set of media segments according to the change in membership of the social media group to generate a modified set of media segments, and transmitting the modified set of media segments to the first user equipment for presentation at the first user equipment. Other embodiments are disclosed.

20 Claims, 7 Drawing Sheets

(56) References Cited

U.S. PATENT DOCUMENTS

| | | | | |
|---|---|---|---|---|
| 8,442,922 | B2* | 5/2013 | Martin | G06F 17/30247 |
| | | | | 705/319 |
| 8,522,289 | B2* | 8/2013 | Athsani | G06Q 30/02 |
| | | | | 707/733 |
| 8,565,689 | B1 | 10/2013 | Rubin et al. | |
| 8,606,742 | B1 | 12/2013 | Kim | |
| 8,610,786 | B2 | 12/2013 | Ortiz et al. | |
| 8,712,944 | B1 | 4/2014 | Kim | |
| 8,875,177 | B1 | 10/2014 | Sharma et al. | |
| 8,977,641 | B1 | 3/2015 | Crichton et al. | |
| 9,020,832 | B2 | 4/2015 | Malinovsky et al. | |
| 9,065,877 | B2* | 6/2015 | Abrams | H04N 5/247 |
| 9,210,477 | B2* | 12/2015 | Pacor | H04N 21/21805 |
| 10,095,686 | B2 | 10/2018 | Zhang et al. | |
| 10,387,504 | B1 | 8/2019 | Kolcz | |
| 2002/0120752 | A1* | 8/2002 | Logan | H04L 65/4084 |
| | | | | 709/228 |
| 2003/0093797 | A1 | 5/2003 | Bazzaz et al. | |
| 2003/0236907 | A1* | 12/2003 | Stewart | H04L 29/06 |
| | | | | 709/231 |
| 2005/0188399 | A1 | 8/2005 | Tischer et al. | |
| 2005/0193421 | A1* | 9/2005 | Cragun | H04N 5/247 |
| | | | | 725/80 |
| 2006/0174297 | A1 | 8/2006 | Anderson et al. | |
| 2008/0134235 | A1* | 6/2008 | Kalaboukis | H04N 5/76 |
| | | | | 725/32 |
| 2009/0089352 | A1* | 4/2009 | Davis | G06Q 10/00 |
| | | | | 709/201 |
| 2009/0293079 | A1* | 11/2009 | McKee | G06Q 10/105 |
| | | | | 725/10 |
| 2010/0088159 | A1* | 4/2010 | Henshaw | G06Q 10/02 |
| | | | | 715/716 |
| 2010/0199295 | A1* | 8/2010 | Katpelly | G06F 17/30053 |
| | | | | 725/14 |
| 2011/0090347 | A1 | 4/2011 | Buckner et al. | |
| 2011/0271197 | A1 | 11/2011 | Jones et al. | |
| 2011/0306325 | A1* | 12/2011 | Gutta | H04N 7/148 |
| | | | | 455/414.1 |
| 2012/0179981 | A1 | 7/2012 | Whalin et al. | |
| 2012/0330950 | A1* | 12/2012 | Pichumani | H04L 65/4076 |
| | | | | 707/736 |
| 2013/0041947 | A1 | 2/2013 | Sammon | |
| 2013/0104070 | A1* | 4/2013 | Blake | G06Q 50/01 |
| | | | | 715/777 |
| 2014/0036090 | A1 | 2/2014 | Black et al. | |
| 2014/0046955 | A1* | 2/2014 | Dollard | G06Q 30/0251 |
| | | | | 707/748 |
| 2014/0195675 | A1* | 7/2014 | Silver | H04L 65/1083 |
| | | | | 709/224 |
| 2014/0201334 | A1* | 7/2014 | Wang | H04L 65/4084 |
| | | | | 709/219 |
| 2014/0214404 | A1 | 7/2014 | Kalia et al. | |
| 2014/0267747 | A1* | 9/2014 | Kritt | H04N 7/181 |
| | | | | 348/159 |
| 2014/0327779 | A1 | 11/2014 | Eronen et al. | |
| 2014/0379729 | A1 | 12/2014 | Savage et al. | |
| 2015/0128014 | A1 | 5/2015 | Monroe | |
| 2015/0180820 | A1* | 6/2015 | Lee | H04L 51/32 |
| | | | | 709/206 |
| 2015/0188967 | A1* | 7/2015 | Paulauskas | H04L 67/10 |
| | | | | 709/219 |
| 2015/0341410 | A1* | 11/2015 | Schrempp | H04L 65/4069 |
| | | | | 709/231 |
| 2016/0065637 | A1* | 3/2016 | O'Malley | H04L 67/306 |
| | | | | 709/231 |
| 2016/0170967 | A1 | 6/2016 | Allen et al. | |
| 2016/0170968 | A1 | 6/2016 | Allen et al. | |
| 2016/0291921 | A1* | 10/2016 | Miller | H04N 21/4788 |
| 2016/0294762 | A1* | 10/2016 | Miller | H04L 51/32 |
| 2016/0294890 | A1* | 10/2016 | Miller | H04L 51/32 |
| 2016/0294894 | A1 | 10/2016 | Miller | |
| 2016/0344667 | A1 | 11/2016 | Lane et al. | |
| 2016/0381111 | A1* | 12/2016 | Barnett | H04L 65/601 |
| | | | | 709/231 |
| 2017/0060917 | A1 | 3/2017 | Marsh | |
| 2017/0083628 | A1 | 3/2017 | Frenkel et al. | |
| 2017/0214650 | A1 | 7/2017 | Balasaygun et al. | |
| 2017/0223064 | A1 | 8/2017 | Le Devehat et al. | |

OTHER PUBLICATIONS

"Streamweaver: split-screen synchronicity", Streamweaver, streamweaver.com, Jan. 13, 2013.
"Switchcam", Switchcam.com, Nov. 2, 2011.

* cited by examiner

200

300

US 11,050,845 B2

METHOD AND APPARATUS FOR PROVIDING CONFIGURABLE EVENT CONTENT

FIELD OF THE DISCLOSURE

The subject disclosure relates to a method and apparatus for providing configurable event content.

BACKGROUND

Modern telecommunications systems provide consumers with telephony capabilities while accessing a large variety of content. Consumers are no longer bound to specific locations when communicating with others or when enjoying multimedia content or accessing the varied resources available via the Internet. Network capabilities have expanded and have created additional interconnections and new opportunities for using mobile communication devices in a variety of situations. Intelligent devices offer new means for experiencing network interactions in ways that anticipate consumer desires and provide solutions to problems.

BRIEF DESCRIPTION OF THE DRAWINGS

Reference will now be made to the accompanying drawings, which are not necessarily drawn to scale, and wherein.

DETAILED DESCRIPTION

Figure 1:
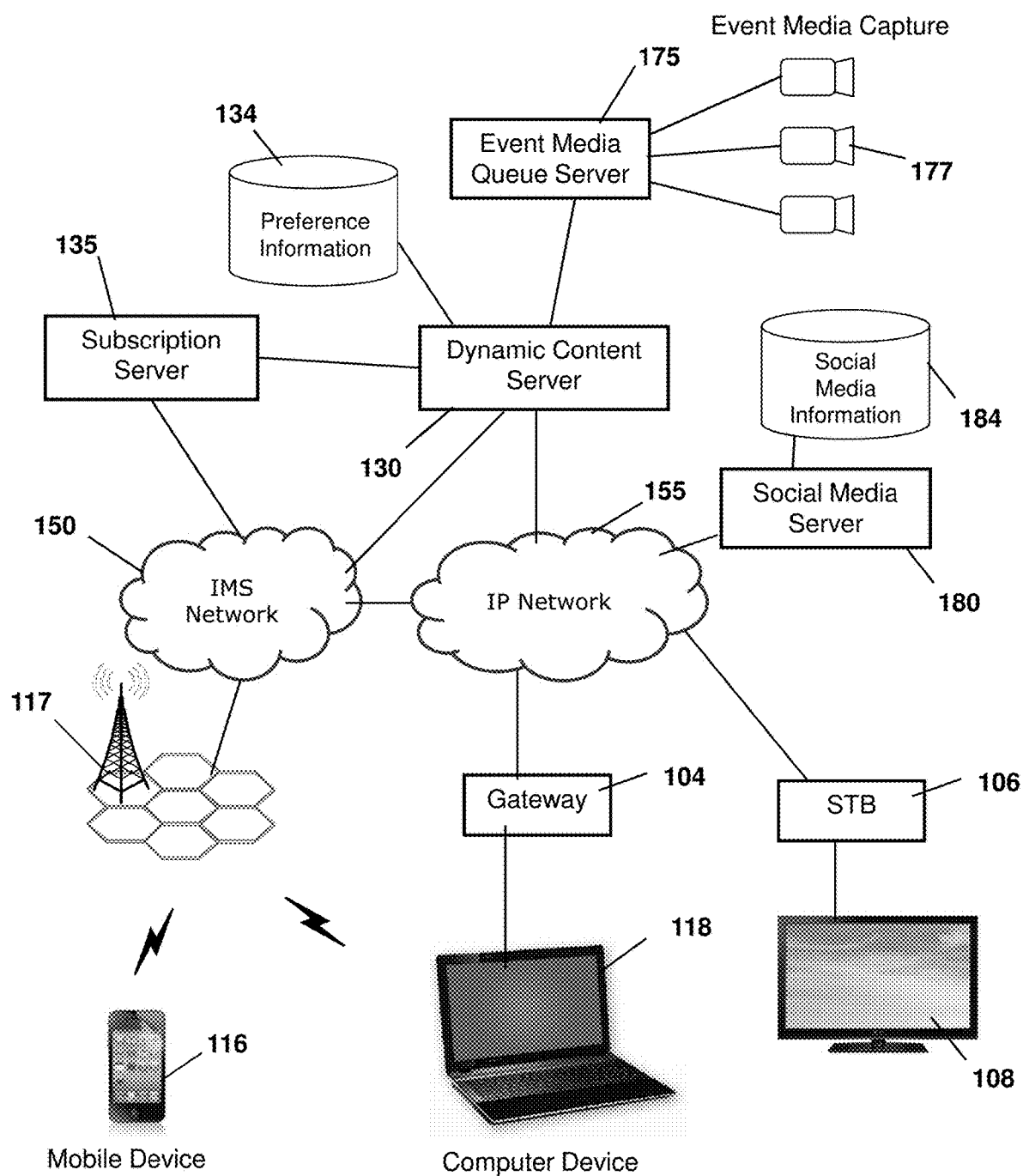
FIG. 1 depicts illustrative embodiments of a system for providing configurable event content in a communication network.

The subject disclosure describes, among other things, illustrative embodiments for providing dynamically configurable, media content for an event. Several media streams can be captured at an event, such as a sporting event or a concert. The media streams can be partitioned into a set of media segments, such as ten second clips, that can be made available viewing. Information can be collected from a social media site to which a user of a user device is a member. The social media information can provide insight into the user's interests, particularly with respect to items in the event that the user likely wants to see. The social media information can be used to select a subset of the media segments and transmit these to the user equipment of the user. Subsequent interactions of the user, or of other site members, with the social media site can be monitored during transmission of the media segments. These interactions can indicate changes in focus or interest on the part of the user or other members of the social media group. As the focus or interest of the user and/or the group changes, the set of media segments can be modified so that the user and/or the group can receive the set of media segments that they want to see. Other embodiments are described in the subject disclosure.

One or more aspects of the subject disclosure include a server device including a memory to store executable instructions and a processor communicatively coupled to the memory. The processor, responsive to executing the executable instructions, can perform operations for receiving a plurality of media streams associated with a media event and, in turn, partitioning content of the plurality of media streams into media segments to generate a plurality of media segments associated with the media event. The processor can perform operations for receiving preference information associated with a first user of first user equipment, selecting a first set of media segments from the plurality of media segments according to the preference information, and, in turn, transmitting the first set of media segments to the first user equipment for presentation at the first user equipment. The processor can further perform operations for accessing first social media information associated with a first social media group, where the first user is a first member of a plurality of members of the first social media group and, in turn, determining a change in the preference information according to the first social media information. The processor can also perform operations for modifying the first set of media segments according to the change in preference information to generate a modified set of media segments; and, in turn, transmitting the modified set of media segments to the first user equipment for presentation at the first user equipment.

One or more aspects of the subject disclosure include a method, operating at a system comprising a processor, including receiving, by a system comprising a processor, a first set of media segments from a media server according to preference information associated with a first user of the system and, in turn, presenting the first set of media segments. The first set of media segments can be selected by the media server from an aggregation of media segments of a plurality of media streams associated with a media event. The method can also include accessing, by the system, a first social media group, wherein the first user is a first member of a plurality of members of the first social media group. The method can further include receiving a second set of media segments and, in turn, presenting the second set of media segments. The second set of media segments can be generated by the media server by modifying the first set of media segments according to preference information associated with the first user. The preference information can be based on first social media information associated with the first social media group.

Figure 2:
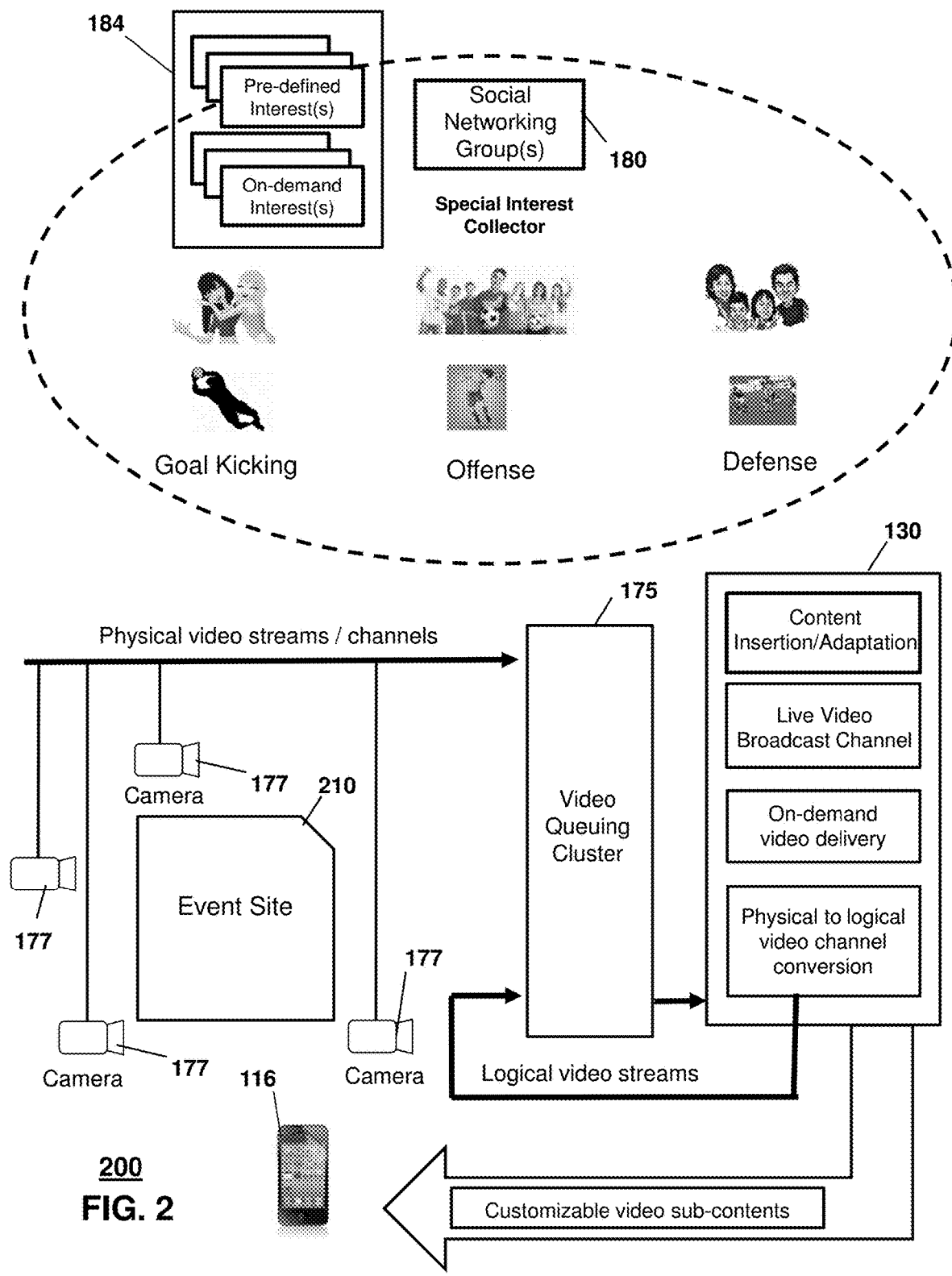
FIG. 2 depicts illustrative embodiments of a system for providing relevant content and services to a user of a mobile device in a communication network.

Referring now to FIGS. 1 and 2, a communication system 100 is illustrated. The system 100 can provide wireless communication services, including voice, video data and/or messaging services to mobile communications devices 116 and other computer devices 118. The system 100 can provide wireline communication services, such as serving as an Internet Service Provider (ISP) for computer devices 118. The system 100 can provide subscription television services via wired and/or wireless communications. For example, the system 100 can provide streaming media content to a mobile communication device 116, via a cellular link 117, to a computer device 118, via a wired or wireless gateway 104, or to a television or monitor device 108, via a set-top box device 106. System 100 can enable wireless communication services over a number of different networks, such as between mobile communication devices 116 and computer devices 118. Mobile communication devices 116 can include a number of different types of devices that are capable of voice, video, data and/or messaging communications, including cellular phones, smartphones, personal computers, media processing devices, and so forth.

In one or more embodiments, the communication system 100 can provide access to an Internet Protocol (IP) Multimedia Subsystem (IMS) network 150 to facilitated combined services of circuit-switched and packet-switched systems. The IMS network 150 can be accessed, for example, via one or more cellular base stations 117. For example, a mobile communication device 116 can connect to a cellular base station 117 via a wireless communication signal. The mobile communication device 116 can communication, via the IMS network 150, with other mobile communication devices, with landline communication devices, and with an Internet Protocol (IP) network 155, such as the Internet or the world-wide web (WWW). The communication system 100 can provide communications and sharing of various resources between mobile communication devices 116 and various devices, such as computer devices 118, which are connected to the IP network 155.

In one or more embodiments, the system 100 can include a dynamic content server 130. The dynamic content server 130 can receive media streams from an event media queue server 175. For example, media can be captured at an event, such as an athletic contest, an entertainment performance, or a political debate. The media can be captured by a set of media capture devices 177. For example, the media capture devices 177 can include a group of video cameras and/or microphones can be provided to capture what is occurring at an event at various places and/or perspectives. An athletic event can be captured with twenty cameras and thirty microphones, resulting in fifty media signal feeds. In a typical event coverage scheme, these media feeds would collected at a production facility. Production personal would mix these signals together, as guided by a director, to generate a single, continuous media stream of the event for broadcast to viewers.

In one or more embodiments, herein, the event media queue server 175 can collect media streams from the multiple media capture devices 177 that are capturing the event. The event media capture server 175 can be located at the event site 210. The event media capture server 175 transmit raw data streams to the dynamic content server 130 for any number or all of the media capture devices 177. As a result, the dynamic content server 130 can have access to the raw, captured streams rather than only having access to the "as directed" version of the event that is available for broadcast. The dynamic content server 130 can provide one or more of the raw media data streams to devices 116, 118, and 108 that are connected to the dynamic content server 130 via the IP network 155.

In one or more embodiments, the media capture devices 177 can include video cameras and/or audio microphones. The media capture devices 177 can be stationary and/or moveable devices that are deployed at the event site 210. The media capture devices 177 can capture important or desired, fixed angles of the event (e.g., aerial overview, behind the basket at a basketball game, beside the goalpost for a soccer match). The capture devices 177 can be moveable to facilitate capture of moving objects and/or participants in the event (e.g., soccer ball, racing cars).

In one or more embodiments, the dynamic content server 130 can partition each of the media streams into many segments of sub-content. For example, a given media stream from the event can be partitioned into one second or ten second sections of sub-content. The media content segments allow the dynamic content server 130 to assemble a very large variety of customized media feeds for any subscriber device 116.

In one or more embodiments, a subscriber can access the dynamic content server 130 from a device, such a mobile communication device 116, a computer device 118, or a television 108. In one example, a subscriber using a mobile communication device 116 can connect to the dynamic content server via the IMS network 150. The dynamic content server 130 can be accessed by a client application executing at the mobile communication device 116. In one or more embodiments, the dynamic content server 130 can access a subscription server 135 to authenticate the subscriber and/or the mobile communication device 116. The client application can require the subscriber to enter verification information, such as a username and passcode, which can be authenticated against a subscriber profile that is maintained at the subscriber server 135. In another example, the subscription server can maintain verification information for the mobile communication device 116, itself, such that the subscriber does not need to enter verification information. In one or more embodiments, the subscriber can access the dynamic content server 130 via the IP network 155 using, for example, a gateway device 104. The computer device 118 can use a client application or a general purpose browser to contact the dynamic content server 130 via a portal. The dynamic content server 130 can use the subscription server 130 for authenticating portal access by the computer device 118 using subscriber and/or machine verification. In one or more embodiments, the television or monitor device 108 can access the dynamic content server 130 via a media processor device 106, such as a set-top box. The media processor device 106 can communicate with the dynamic content server 130 via the IP network 155 and/or a private network. The dynamic content server 130 can authentic the media processor device 106 via the subscription server 135. In one or more embodiments, the dynamic content server 130 can connect and communicate with devices 116, 118, and 108 for providing streaming content services using other techniques, such as satellite communication links and optical links.

In one or more embodiments, the dynamic content server 130 can maintain preference information 134 that is associated with subscribers to the content services. The preference information can include preferences for how content is delivered, types of devices 116 that the subscribers uses, and types or genres of content that the subscriber prefers. In one or more embodiments, the preference information 134 can include subscriber preferences that are particular to the selection and presentation of multiple media streams that are captured at events. For example, the subscriber may prefer to continuously view, at a large window of her television display 108, content from a main media stream that depicts the "directed" feed of the event. Meanwhile, she also wants to view, at a smaller window on the display, a sequence of ten to twenty second clips from between three and five other video feeds from the event. Or, the subscriber may wish to view the "secondary" video clip sequence on her mobile device 116. The dynamic content server 130 can maintain these preferences in the preference information to link, for example, a particular subscriber (e.g., Anna) with a particular type of program (e.g., Professional Rodeo), a particular television network or website (e.g., RFD-TV), and a configuration of media streams (e.g., one main network feed, and three to five secondary feeds including a bull pen feed, an interview feed, and a camera worn by a rodeo clown.

In one or more embodiments, the preference information can include past preferences and configurations that the subscriber has selected, as well as preferences and configurations that the dynamic content server 130 has derived for the subscriber. The subscriber can provide preferences by entering information, responding to queries during the viewing of content (e.g., "Do you prefer configuration A or B"), and/or by accepting default configurations. The dynamic content server 130 can monitor for changes in preferences by comparing current preferences to past preference, and determine whether to update the subscriber's preferences. In one embodiment, the dynamic content server 130 can update the subscriber's preference information every time the subscriber requests a different configuration of media streams or accepts a suggested configuration from the dynamic content server 130 In another embodiment, the dynamic content server 130 can determine if a change in a preference during a current media content session is significant enough to trigger an update in the preference information that is saved at the preference information database 134. For example, the subscriber may be a frequent viewer of a business network, where he watches the "event" of the daily operation of the stock markets in New York. He may have a preferred configuration that provides media streams of several specific stock trading desks, a national business news coverage stream, and an audio stream of his favorite business talk show. However, on a given day, world events may cause a change in either the subscriber's desired content mix, the available content mix, or both. If the configuration of media streams that are used by the subscriber changes for that day, then the dynamic content server 130 may determine that the change is a "one off" event such that the typical subscriber preference should be retained and used for subsequent days.

In one or more embodiments, the dynamic content server 130 can derive preference information 134 for the subscriber and recommend configuration changes (or an entirely different configuration) to the subscriber for acceptance or rejection. In one or more embodiments, the recommended configuration changes can be based on social media information that is associated with the subscriber. The subscriber can be a member of one or more social media networks (e.g., Facebook™, Twitter™). As part of these social media networks, the subscriber can have associated co-members (e.g., "Friends"), who share interests. For example, the subscriber can be a big fan of a particular European soccer club and can be member of several social media sites that focus on this club, soccer in general, or a particular player. In one or more embodiments, the dynamic content server 130 can have permission to access social media information 184 for this subscriber. For example, the subscriber can provide permission (e.g., Opt In) to dynamic content server 130 as part of joining the service. Or, permission can be afforded by the social media network as part of joining that service. When the dynamic content server 130 accesses the subscriber's social media information 184, it can access the subscriber's list of "friends" or "followers" and/or any affinity groups that she has joined. The dynamic content server 130 can access comments—which can be converted into anonymous comments to protect privacy—and/or reactions to comments of other members and/or links to content that are associated with the subscriber and/or social media group.

In one or more embodiments, the dynamic content server 130 can analyze the subscriber's social media information (including that of the subscriber's social media groups) to determine and/or suggest preference information for the subscriber. For example, the social media information can reveal an interest by the subscriber (or by some portion of her social group) in following a particular defender on her preferred soccer club based on her social media comments. In another example, a fellow social group member can indicate that he is will be on the sidelines as a reporter at the coming match. In another example, the soccer team affinity site can have a set of media streams that it will be streaming for the coming match. The dynamic content server 130 can aggregate this social media information and provide the subscriber with a suggested set of media streams, or a suggested configuration for how to experience the available media streams, based on the aggregated social media information. The combination of the subscriber's prior preference information and the preference information 134 that the dynamic content server 130 has recommended based on analysis of social media information 184 can be thought of as the subscriber's pre-defined interests (i.e., the interests that she brings with her in approaching the event. The dynamic content server 135 can mine these pre-defined interests to select and/or suggest a set of media segments and/or media streams and/or viewing configurations for experiencing these streams. In one or more embodiments, the subscriber can accept or reject a set of media streams and/or viewing configurations that are sent the device 116 by the dynamic content server 130.

In one or more embodiments, a subscriber can interact with a social media network 180 while experiencing an event via the media streams and/or media segments that are received from the dynamic content server 130. For example, the subscriber can participate with a social media group at a social media network site or application on first device 116 while viewing the event media streams and/or media segments on a second device 118. In another embodiment, the subscriber can experience the media streams via the social media network, itself, such that the media content channel and the social media network are the same. In one or more embodiments, the dynamic content server 130 can monitor subscriber interactions with the social media group that are occurring during the event. As the subscriber and/or other group members interact with the social media group, the dynamic content server 130 can monitor these interactions to determine and update the preference information. These preferences can be thought of as on-demand interests since they reflect the interests of the subscriber and/or the group during the event. Since the subscriber and the social group are "always" connected and interacting while the event media content is streaming, a feedback loop is created between the media content streams and the social interactions and reactions. This "always ON" feedback loop allows the dynamic content server 130 to dynamically adjust the event media streams in reaction to the social media for better aligning to the preferences and interests of the subscriber and group.

In one or more embodiments, the dynamic content server 130 can react immediately to changes in interest as exemplified by changes in social media information 184 caused by the subscriber and/or group members of the social media group. For example, when a soccer match begins, the dynamic content server 130 can determine that the subscriber is most interested in watching a main network feed of the match along with secondary feeds that show the goal areas of each team from a "back of the goal" perspective. However, midway through the first period of the match, the subscriber requests, via the web portal that she is using to watch the match at her computer device 118, that goal area feed for the opposing team be replaced with a feed that shows overhead "drone" view of the soccer pitch. As a result, the dynamic content server 130 concludes that the subscriber's preference has directly changed. The dynamic content server 130 immediately replace the goal area feeds with the overhead view feed and begin transmitting the set of media streams to the device 118. Now that the subscriber has made this direct request, the dynamic content server 130 can determine whether to the subscriber's preference information to reflect this change. In addition, the dynamic content server 130 can combine the subscriber's demonstrated preference or interest with the social media information that is associated with the subscriber. In one embodiment, the dynamic content server 130 can conclude that other members of the social media group will now also wish to modify the set of media streams that they are receiving in light of the subscriber's decision. The dynamic content server 130 can offer a modified set of data streams to devices of other group members.

In one or more embodiments, the subscriber or any member of the subscriber's social media group can request a replay of one or more media segments and/or a sequence from a media stream that is being received at a device 116. For example, the subscriber may request at her viewing device 118 to view something that happened on a particular media stream feed twenty minutes ago. The device 118 can send a request to the dynamic content server 130 for to replay content. The dynamic content server 130 can access the partitioned, sub-content segments of each media stream, and can provide one or more segments of content to the subscriber device 118. Further, the subscriber can request a "custom" set of replays. Returning to the soccer match example, the subscriber can request to see a set of previously shown segments of sub-content featuring every shot on goal, every instance of her favorite player handling the ball, and the crowd reactions shots after each goal score. The dynamic content server 130 can automatically find the segments of sub-content from the event media streams, which match the requested items. The dynamic content server 130 can then send a custom replay "package" to the subscriber device 118. In one or more embodiments, the dynamic content server 130 can also offer this custom replay package to other members of the subscriber's social media group, who are likely to be interested in seeing this package based on their social media information. Thus, the dynamic content server 130 allows member of the social media group to act as a "video editor" for selecting and publishing a replay package to the group.

In one or more embodiments, as a subscriber device 116 requests a replay of one or more segments of an event media stream, a dedicated downlink data channel can be opened for providing the requested replay stream to the device 116. The dynamic content server 130 can determine the time positions in the event media stream or streams, and can transmit the segments from these time positions over the dedicated downlink channel. Once the subscriber has viewed the requested replay or replays, the dedicated downlink data channel can be closed.

Figure 3:
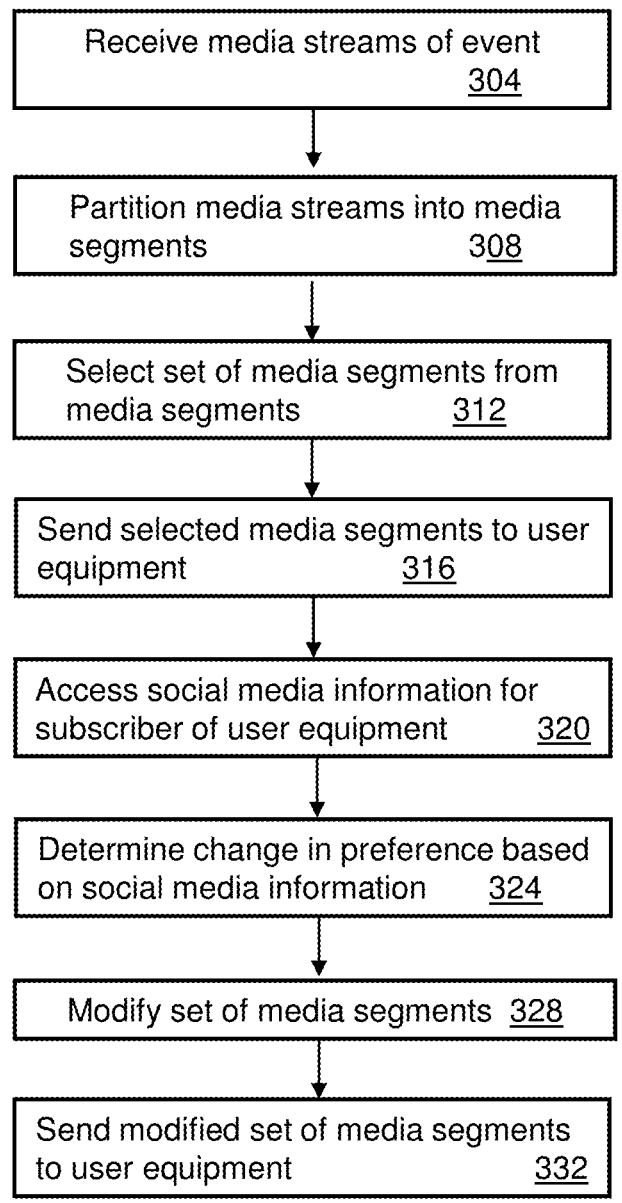
FIG. 3 depicts illustrative embodiments of a method used in portions of the system described in FIGS. 1 and 2.

FIG. 3 depicts an illustrative embodiment of a method used by in portions of the system described in FIGS. 1 and 2. In particular, FIG. 3 shows illustrative embodiments of a method 300 for providing dynamically configurable, media content to subscriber devices.

In step 304, a dynamic content server 130 can receive a group of media content streams that are captured at an event. For example, media capture devices (e.g., video cameras and/or microphones) can be placed at the event. The media capture devices can capture visual and audio data from the event, which can be received at the dynamic content server 130 as a group of individual media content streams. In step 308, the dynamic content server 103 can partition the media streams into media segments. For example, each content media stream can be partitioned into a series of 1 second segments of sub-content.

In step 312, the dynamic content server 130 can select a set of media segments from the portioned media streams. The dynamic content server 130 use subscriber preference information for determining a subscriber's interests in the event. In one embodiment, if the subscriber has indicated, either directly or indirectly, that she is interested in seeing certain facets of an event, then dynamic content server 130 can select media segments that focus on those aspects. In one embodiments, the dynamic content server 130 can determine the subscriber's interests based on social media information 184 that is associated with the subscriber. The determinations regarding the subscriber's interests can be dynamic, with new interests being discovered (and old interests discarded) during the event. The selected media segments can include long portions of raw or edited versions of the captured media content. In step 316, the dynamic content server 130 can transmit the selected media segments to the subscriber's device 116 for viewing by the subscriber.

In step 320, the dynamic content server 130 can access the subscriber's social media information to determine, in step 324, if there has been a change in the subscriber's interests (i.e., is there evidence that the subscriber may want to see or hear something different?). The social media information can include posts to social media sites and/or expressions of approval or disapproval information already posted. The social media information can include references to particular facets of the event and/or particular content segments and/or streams by the subscriber or other members of the social media group. In one embodiment, a member of the social media group may select one or more media segments for replay. The dynamic content server 130 can detect the replay request from the social media information and determine that the subscriber is likely to be interested in the same replay.

In step 328, the dynamic content server 130 can user the detected change in preference or interest to modify the set of media segments and/or media streams in the content stream that it is currently sending to the subscriber's device 116. The dynamic content server 130 can offer this modified set of content to the subscriber's device for accept or rejection. In one embodiment, the dynamic content server 130 can continue to send an unmodified set of media content to the device 116 until an indication of acceptance of the modification is received. In one embodiment, the subscriber can select an option, where the dynamic content server 130 is allowed to immediately switch to the modified set of content whenever the determined change in preference or interest satisfies a previously agreed threshold. For example, the dynamic content server 130 automatically switch to the modified set of content anytime it detects an newly available replay "package" has been selected by a particular member of the social media group. In step 332, the dynamic content server 130 can send the modified set of media segments and/or media streams to the subscriber's device 116.

While for purposes of simplicity of explanation, the respective processes are shown and described as a series of blocks in FIG. 3, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described herein.

Figure 4:
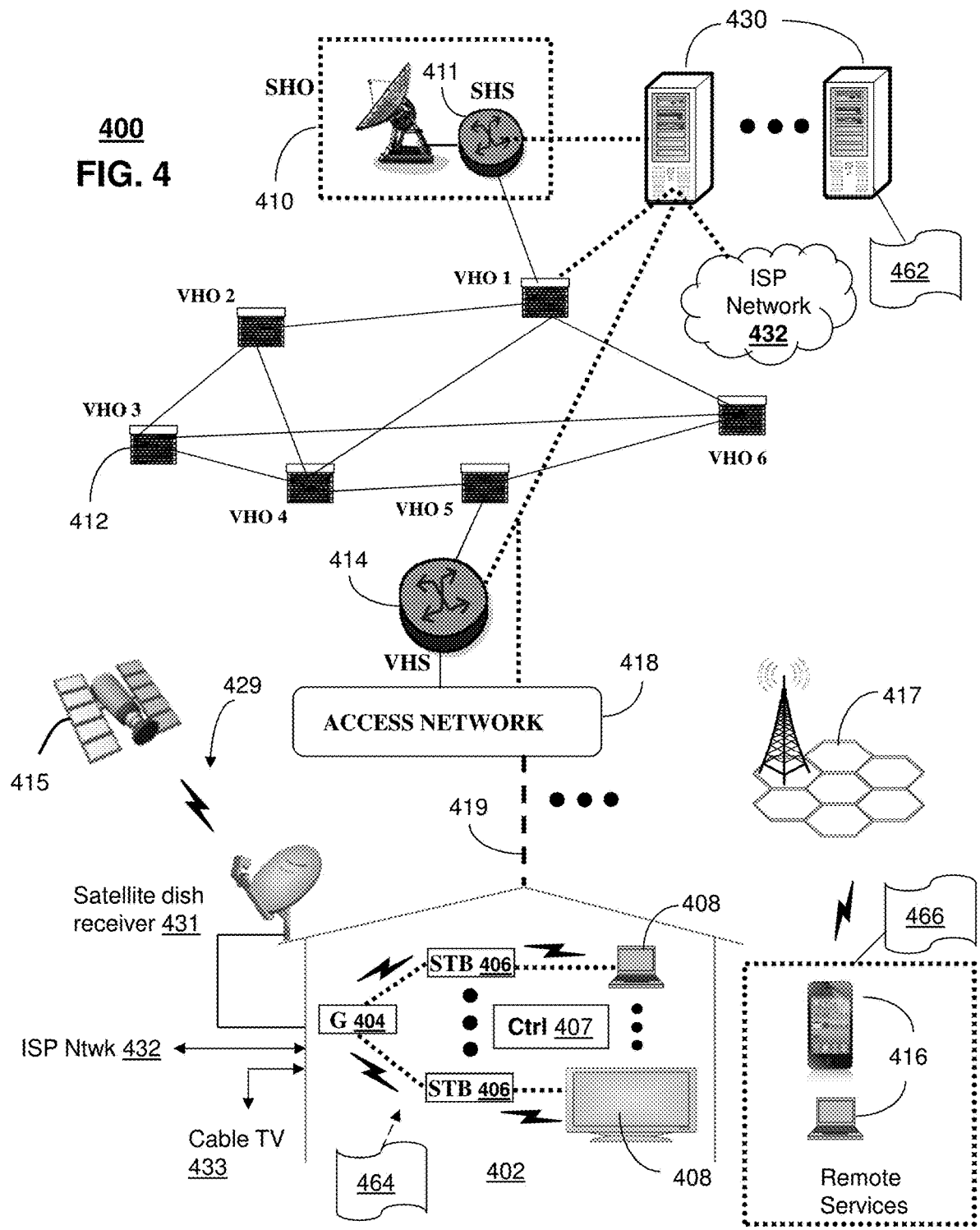
FIGS. 4-5 depict illustrative embodiments of communication systems that provide configurable event content according to the embodiments illustrated in FIGS. 1 and 2.

FIG. 4 depicts an illustrative embodiment of a first communication system 400 for delivering media content. The communication system 400 can represent an Interactive Television System, such as an Internet Protocol Television (IPTV) media system. Communication system 400 can be overlaid or operably coupled with systems 100 and 200, of FIGS. 1 and/or 2, as another representative embodiment of communication system 400. For instance, one or more devices illustrated in the communication system 400 of FIG. 4 can be used for providing dynamically configurable, media content from an event. The media content can be in the form of sub-content segments that are partitioned from a group of media streams captured at the event. Subscriber preference information can be maintained and updated based on social media information and can be used to determined interest in various facets of the event. The subscriber's interests can, in turn, be used to select sets of media segments and/or media streams from the event that will satisfy the subscriber. As the event transpires, the social media information is further monitored to determine changes in interest, and, in turn, the media content package is dynamically modified. In one or more embodiments, monitoring of information can be performed subject to authorization or permission from users associated with the information, such as a source of the information and/or a recipient of the information.

The IPTV media system can include a super head-end office (SHO) 410 with at least one super headend office server (SHS) 411 which receives media content from satellite and/or terrestrial communication systems. In the present context, media content can represent, for example, audio content, moving image content such as 2D or 3D videos, video games, virtual reality content, still image content, and combinations thereof. The SHS server 411 can forward packets associated with the media content to one or more video head-end servers (VHS) 414 via a network of video head-end offices (VHO) 412 according to a multicast communication protocol.

The VHS 414 can distribute multimedia broadcast content via an access network 418 to commercial and/or residential buildings 402 housing a gateway 404 (such as a residential or commercial gateway). The access network 418 can represent a group of digital subscriber line access multiplexers (DSLAMs) located in a central office or a service area interface that provide broadband services over fiber optical links or copper twisted pairs 419 to buildings 402. The gateway 404 can use communication technology to distribute broadcast signals to media processors 406 such as Set-Top Boxes (STBs) which in turn present broadcast channels to media devices 408 such as computers or television sets managed in some instances by a media controller 407 (such as an infrared or RF remote controller).

The gateway 404, the media processors 406, and media devices 408 can utilize tethered communication technologies (such as coaxial, powerline or phone line wiring) or can operate over a wireless access protocol such as Wireless Fidelity (WiFi), Bluetooth®, Zigbee®, or other present or next generation local or personal area wireless network technologies. By way of these interfaces, unicast communications can also be invoked between the media processors 406 and subsystems of the IPTV media system for services such as video-on-demand (VoD), browsing an electronic programming guide (EPG), or other infrastructure services.

A satellite broadcast television system 429 can be used in the media system of FIG. 4. The satellite broadcast television system can be overlaid, operably coupled with, or replace the IPTV system as another representative embodiment of communication system 400. In this embodiment, signals transmitted by a satellite 415 that include media content can be received by a satellite dish receiver 431 coupled to the building 402. Modulated signals received by the satellite dish receiver 431 can be transferred to the media processors 406 for demodulating, decoding, encoding, and/or distributing broadcast channels to the media devices 408. The media processors 406 can be equipped with a broadband port to an Internet Service Provider (ISP) network 432 to enable interactive services such as VoD and EPG as described above.

In yet another embodiment, an analog or digital cable broadcast distribution system such as cable TV system 433 can be overlaid, operably coupled with, or replace the IPTV system and/or the satellite TV system as another representative embodiment of communication system 400. In this embodiment, the cable TV system 433 can also provide Internet, telephony, and interactive media services. System 400 enables various types of interactive television and/or services including IPTV, cable and/or satellite.

The subject disclosure can apply to other present or next generation over-the-air and/or landline media content services system.

Some of the network elements of the IPTV media system can be coupled to one or more computing devices 430, a portion of which can operate as a web server for providing web portal services over the ISP network 432 to wireline media devices 408 or wireless communication devices 416.

Communication system 400 can also provide for all or a portion of the computing devices 430 to function as a dynamic content server 130 (herein referred to as dynamic content server 430). The dynamic content server 430 can use computing and communication technology to perform function 462, which can include among other things, the dynamic content modification techniques described by method 300 of FIG. 3. For instance, function 462 of server 430 can be similar to the functions described for the dynamic content server 130, of FIGS. 1 and 2, in accordance with method 300, of FIG. 3. The media processors 406 and wireless communication devices 416 can be provisioned with software functions 464 and 466, respectively, to utilize the services of dynamic content server 430. For instance, functions 464 and 466 of media processors 406 and wireless communication devices 416 can be similar to the functions described for the communication devices 116, 118, and 106 of FIG. 1 in accordance with method 300, of FIG. 3.

Multiple forms of media services can be offered to media devices over landline technologies such as those described above. Additionally, media services can be offered to media devices by way of a wireless access base station 417 operating according to common wireless access protocols such as Global System for Mobile or GSM, Code Division Multiple Access or CDMA, Time Division Multiple Access or TDMA, Universal Mobile Telecommunications or UMTS, World interoperability for Microwave or WiMAX, Software Defined Radio or SDR, Long Term Evolution or LTE, and so on. Other present and next generation wide area wireless access network technologies can be used in one or more embodiments of the subject disclosure.

Figure 5:
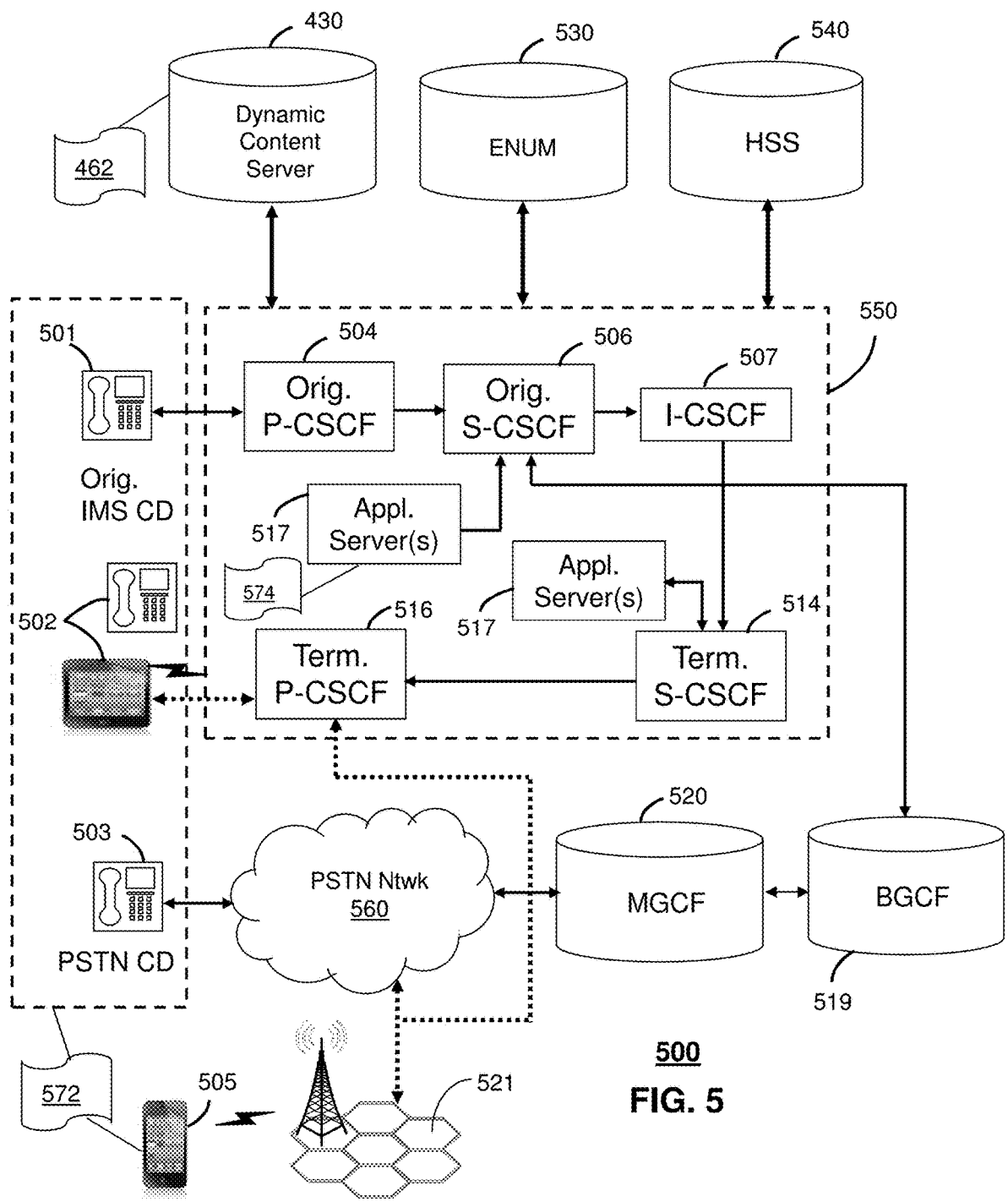

FIG. 5 depicts an illustrative embodiment of a communication system 500 employing an IP Multimedia Subsystem (IMS) network architecture to facilitate the combined services of circuit-switched and packet-switched systems. Communication system 500 can be overlaid or operably coupled with systems 100 and 200, of FIGS. 1 and 2, and communication system 400 as another representative embodiment of communication system 400. The communication system 500 of FIG. 5 can be used for providing dynamically configurable, media content from an event. The media content can be in the form of sub-content segments that are partitioned from a group of media streams captured at the event. Subscriber preference information can be maintained and updated based on social media information and can be used to determined interest in various facets of the event. The subscriber's interests can, in turn, be used to select sets of media segments and/or media streams from the event that will satisfy the subscriber. As the event transpires, the social media information is further monitored to determine changes in interest, and, in turn, the media content package is dynamically modified.

Communication system 500 can comprise a Home Subscriber Server (HSS) 540, a tElephone NUmber Mapping (ENUM) server 530, and other network elements of an IMS network 550. The IMS network 550 can establish communications between IMS-compliant communication devices (CDs) 501, 502, Public Switched Telephone Network (PSTN) CDs 503, 505, and combinations thereof by way of a Media Gateway Control Function (MGCF) 520 coupled to a PSTN network 560. The MGCF 520 need not be used when a communication session involves IMS CD to IMS CD communications. A communication session involving at least one PSTN CD may utilize the MGCF 520.

IMS CDs 501, 502 can register with the IMS network 550 by contacting a Proxy Call Session Control Function (P-CSCF) which communicates with an interrogating CSCF (I-CSCF), which in turn, communicates with a Serving CSCF (S-CSCF) to register the CDs with the HSS 540. To initiate a communication session between CDs, an originating IMS CD 501 can submit a Session Initiation Protocol (SIP INVITE) message to an originating P-CSCF 504 which communicates with a corresponding originating S-CSCF 506. The originating S-CSCF 506 can submit the SIP INVITE message to one or more application servers (ASs) 517 that can provide a variety of services to IMS subscribers.

For example, the application servers 517 can be used to perform originating call feature treatment functions on the calling party number received by the originating S-CSCF 506 in the SIP INVITE message. Originating treatment functions can include determining whether the calling party number has international calling services, call ID blocking, calling name blocking, 7-digit dialing, and/or is requesting special telephony features (e.g., *72 forward calls, *73 cancel call forwarding, *67 for caller ID blocking, and so on). Based on initial filter criteria (iFCs) in a subscriber profile associated with a CD, one or more application servers may be invoked to provide various call originating feature services.

Additionally, the originating S-CSCF 506 can submit queries to the ENUM system 530 to translate an E.164 telephone number in the SIP INVITE message to a SIP Uniform Resource Identifier (URI) if the terminating communication device is IMS-compliant. The SIP URI can be used by an Interrogating CSCF (I-CSCF) 507 to submit a query to the HSS 540 to identify a terminating S-CSCF 514 associated with a terminating IMS CD such as reference 502. Once identified, the I-CSCF 507 can submit the SIP INVITE message to the terminating S-CSCF 514. The terminating S-CSCF 514 can then identify a terminating P-CSCF 516 associated with the terminating CD 502. The P-CSCF 516 may then signal the CD 502 to establish Voice over Internet Protocol (VoIP) communication services, thereby enabling the calling and called parties to engage in voice and/or data communications. Based on the iFCs in the subscriber profile, one or more application servers may be invoked to provide various call terminating feature services, such as call forwarding, do not disturb, music tones, simultaneous ringing, sequential ringing, etc.

In some instances the aforementioned communication process is symmetrical. Accordingly, the terms "originating" and "terminating" in FIG. 5 may be interchangeable. It is further noted that communication system 500 can be adapted to support video conferencing. In addition, communication system 500 can be adapted to provide the IMS CDs 501, 502 with the multimedia and Internet services of communication system 400 of FIG. 4.

If the terminating communication device is instead a PSTN CD such as CD 503 or CD 505 (in instances where the cellular phone only supports circuit-switched voice communications), the ENUM system 530 can respond with an unsuccessful address resolution which can cause the originating S-CSCF 506 to forward the call to the MGCF 520 via a Breakout Gateway Control Function (BGCF) 519. The MGCF 520 can then initiate the call to the terminating PSTN CD over the PSTN network 560 to enable the calling and called parties to engage in voice and/or data communications.

It is further appreciated that the CDs of FIG. 5 can operate as wireline or wireless devices. For example, the CDs of FIG. 5 can be communicatively coupled to a cellular base station 521, a femtocell, a WiFi router, a Digital Enhanced Cordless Telecommunications (DECT) base unit, or another suitable wireless access unit to establish communications with the IMS network 550 of FIG. 5. The cellular access base station 521 can operate according to common wireless access protocols such as GSM, CDMA, TDMA, UMTS, WiMax, SDR, LTE, and so on. Other present and next generation wireless network technologies can be used by one or more embodiments of the subject disclosure. Accordingly, multiple wireline and wireless communication technologies can be used by the CDs of FIG. 5.

Cellular phones supporting LTE can support packet-switched voice and packet-switched data communications and thus may operate as IMS-compliant mobile devices. In this embodiment, the cellular base station 521 may communicate directly with the IMS network 550 as shown by the arrow connecting the cellular base station 521 and the P-CSCF 516.

Alternative forms of a CSCF can operate in a device, system, component, or other form of centralized or distributed hardware and/or software. Indeed, a respective CSCF may be embodied as a respective CSCF system having one or more computers or servers, either centralized or distributed, where each computer or server may be configured to perform or provide, in whole or in part, any method, step, or functionality described herein in accordance with a respective CSCF. Likewise, other functions, servers and computers described herein, including but not limited to, the HSS, the ENUM server, the BGCF, and the MGCF, can be embodied in a respective system having one or more computers or servers, either centralized or distributed, where each computer or server may be configured to perform or provide, in whole or in part, any method, step, or functionality described herein in accordance with a respective function, server, or computer.

The dynamic content server 430 of FIG. 4 can be operably coupled to communication system 500 for purposes similar to those described above. Dynamic content server 430 can perform function 462 and thereby provide dynamic content services to the CDs 501, 502, 503 and 505 of FIG. 5 similar to the functions described for the dynamic content server 130 of FIG. 1 in accordance with method 300 of FIG. 3. CDs 501, 502, 503 and 505, which can be adapted with software to perform function 572 to utilize the services of the dynamic content server 430 similar to the functions described for communication devices 116 of FIGS. 1 and 2 in accordance with method 300 of FIG. 3. Dynamic content server 430 can be an integral part of the application server(s) 517 performing function 574, which can be substantially similar to function 462 and adapted to the operations of the IMS network 550.

For illustration purposes only, the terms S-CSCF, P-CSCF, I-CSCF, and so on, can be server devices, but may be referred to in the subject disclosure without the word "server." It is also understood that any form of a CSCF server can operate in a device, system, component, or other form of centralized or distributed hardware and software. It is further noted that these terms and other terms such as DIAMETER commands are terms can include features, methodologies, and/or fields that may be described in whole or in part by standards bodies such as $3^{rd}$ Generation Partnership Project (3GPP). It is further noted that some or all embodiments of the subject disclosure may in whole or in part modify, supplement, or otherwise supersede final or proposed standards published and promulgated by 3GPP.

Figure 6:
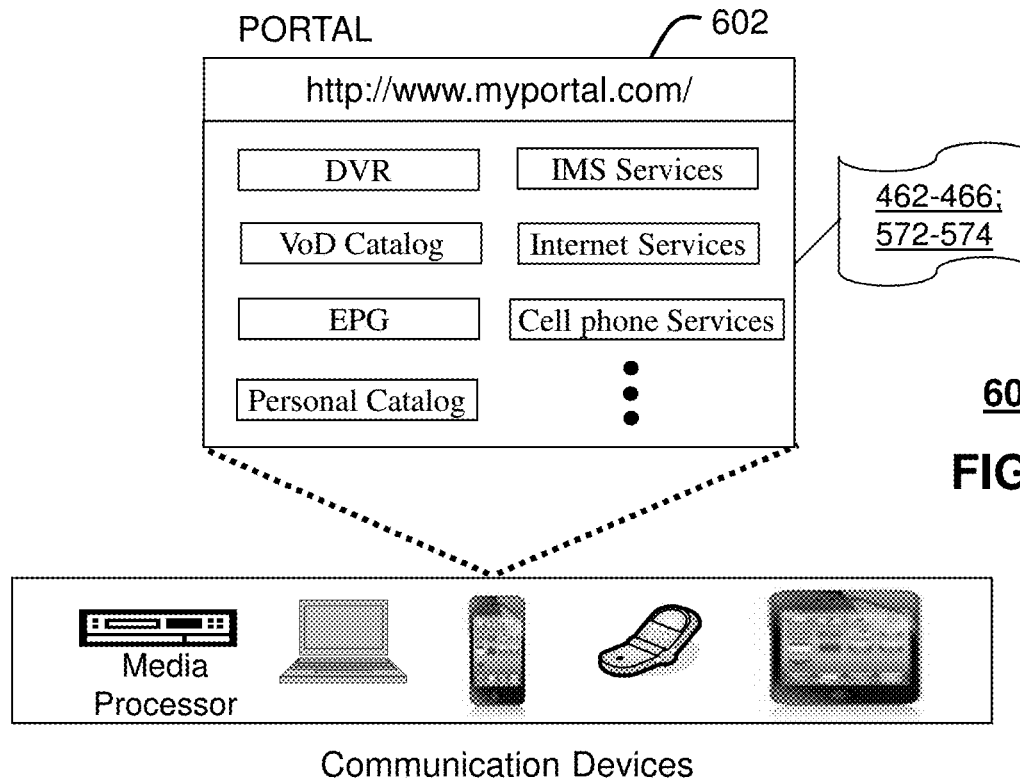
FIG. 6 depicts an illustrative embodiment of a web portal for interacting with the communication systems of FIGS. 1, 2, 4 and 5.

FIG. 6 depicts an illustrative embodiment of a web portal 602 of a communication system 600. Communication system 600 can be overlaid or operably coupled with systems 100 and 200 of FIGS. 1 and 2, communication system 400, and/or communication system 500 as another representative embodiment of systems 100 and 200 of FIGS. 1 and 2, communication system 400, and/or communication system 500. The web portal 602 can be used for managing services of systems 100 and 200 of FIGS. 1 and 2 and communication systems 400 and 500. A web page of the web portal 602 can be accessed by a Uniform Resource Locator (URL) with an Internet browser using an Internet-capable communication device such as those described in FIGS. 1, 2, 4, and 5. The web portal 602 can be configured, for example, to access a media processor 406 and services managed thereby such as a Digital Video Recorder (DVR), a Video on Demand (VoD) catalog, an Electronic Programming Guide (EPG), or a personal catalog (such as personal videos, pictures, audio recordings, etc.) stored at the media processor 406. The web portal 602 can also be used for provisioning IMS services described earlier, provisioning Internet services, provisioning cellular phone services, and so on.

The web portal 602 can further be utilized to manage and provision software applications 462-466, and 572-574 to adapt these applications as may be desired by subscribers and/or service providers of systems 100 and 200 of FIGS. 1 and 2, and communication systems 400 and 500. For instance, users of the services provided by the dynamic content server 130 or 430 can log into their on-line accounts and provision the servers 130 or 430 with preference information regarding media content types and/or configuration of media content or to provide device contact information to the dynamic content server 130 or 430 to enable it to communication with devices described in FIGS. 1-5. Service providers can log onto an administrator account to provision, monitor and/or maintain the systems 100 and 200 of FIGS. 1 and 2 or server 430.

Figure 7:
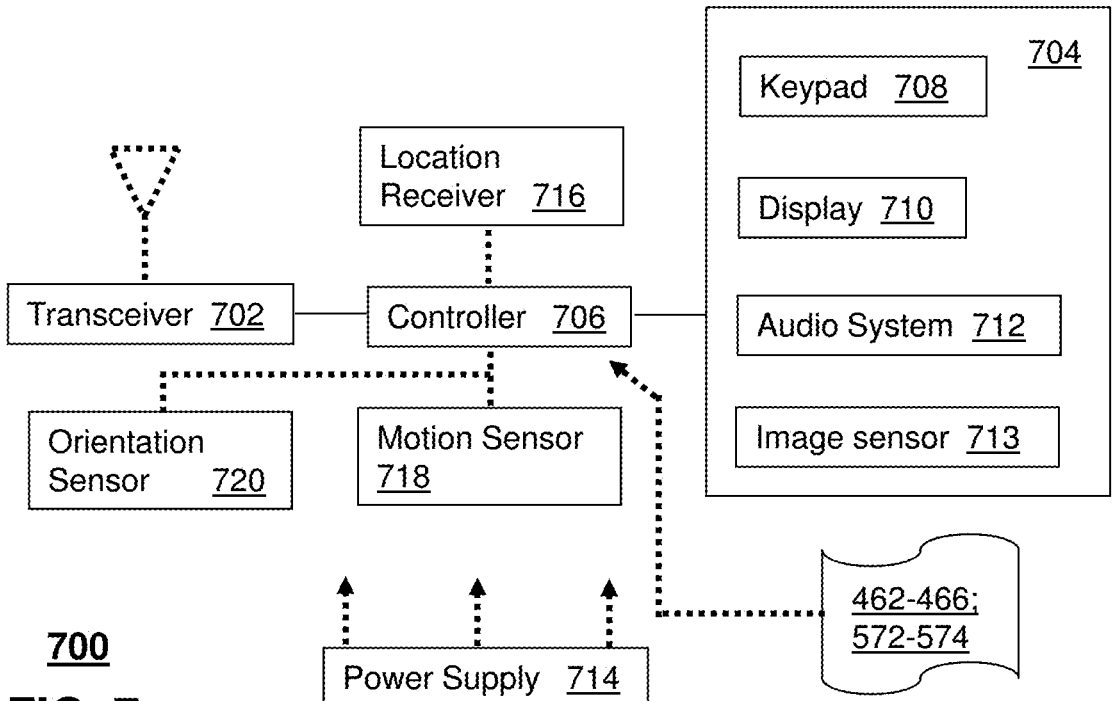
FIG. 7 depicts an illustrative embodiment of a communication device.

FIG. 7 depicts an illustrative embodiment of a communication device 700. Communication device 700 can serve in whole or in part as an illustrative embodiment of the devices depicted in FIGS. 1, 2, 4, and/or 5 and can be configured to perform portions of method 300 of FIG. 3.

Communication device 700 can comprise a wireline and/or wireless transceiver 702 (herein transceiver 702), a user interface (UI) 704, a power supply 714, a location receiver 716, a motion sensor 718, an orientation sensor 720, and a controller 706 for managing operations thereof. The transceiver 702 can support short-range or long-range wireless access technologies such as Bluetooth®, ZigBee®, WiFi, DECT, or cellular communication technologies, just to mention a few (Bluetooth® and ZigBee® are trademarks registered by the Bluetooth® Special Interest Group and the ZigBee® Alliance, respectively). Cellular technologies can include, for example, CDMA-1×, UMTS/HSDPA, GSM/GPRS, TDMA/EDGE, EV/DO, WiMAX, SDR, LTE, as well as other next generation wireless communication technologies as they arise. The transceiver 702 can also be adapted to support circuit-switched wireline access technologies (such as PSTN), packet-switched wireline access technologies (such as TCP/IP, VoIP, etc.), and combinations thereof.

The UI 704 can include a depressible or touch-sensitive keypad 708 with a navigation mechanism such as a roller ball, a joystick, a mouse, or a navigation disk for manipulating operations of the communication device 700. The keypad 708 can be an integral part of a housing assembly of the communication device 700 or an independent device operably coupled thereto by a tethered wireline interface (such as a USB cable) or a wireless interface supporting for example Bluetooth®. The keypad 708 can represent a numeric keypad commonly used by phones, and/or a QWERTY keypad with alphanumeric keys. The UI 704 can further include a display 710 such as monochrome or color LCD (Liquid Crystal Display), OLED (Organic Light Emitting Diode) or other suitable display technology for conveying images to an end user of the communication device 700. In an embodiment where the display 710 is touch-sensitive, a portion or all of the keypad 708 can be presented by way of the display 710 with navigation features.

The display 710 can use touch screen technology to also serve as a user interface for detecting user input. As a touch screen display, the communication device 700 can be adapted to present a user interface with graphical user interface (GUI) elements that can be selected by a user with a touch of a finger. The touch screen display 710 can be equipped with capacitive, resistive or other forms of sensing technology to detect how much surface area of a user's finger has been placed on a portion of the touch screen display. This sensing information can be used to control the manipulation of the GUI elements or other functions of the user interface. The display 710 can be an integral part of the housing assembly of the communication device 700 or an independent device communicatively coupled thereto by a tethered wireline interface (such as a cable) or a wireless interface.

The UI 704 can also include an audio system 712 that utilizes audio technology for conveying low volume audio (such as audio heard in proximity of a human ear) and high volume audio (such as speakerphone for hands free operation). The audio system 712 can further include a microphone for receiving audible signals of an end user. The audio system 712 can also be used for voice recognition applications. The UI 704 can further include an image sensor 713 such as a charged coupled device (CCD) camera for capturing still or moving images.

The power supply 714 can utilize common power management technologies such as replaceable and rechargeable batteries, supply regulation technologies, and/or charging system technologies for supplying energy to the components of the communication device 700 to facilitate long-range or short-range portable applications. Alternatively, or in combination, the charging system can utilize external power sources such as DC power supplied over a physical interface such as a USB port or other suitable tethering technologies.

The location receiver 716 can utilize location technology such as a global positioning system (GPS) receiver capable of assisted GPS for identifying a location of the communication device 700 based on signals generated by a constellation of GPS satellites, which can be used for facilitating location services such as navigation. The motion sensor 718 can utilize motion sensing technology such as an accelerometer, a gyroscope, or other suitable motion sensing technology to detect motion of the communication device 700 in three-dimensional space. The orientation sensor 720 can utilize orientation sensing technology such as a magnetometer to detect the orientation of the communication device 700 (north, south, west, and east, as well as combined orientations in degrees, minutes, or other suitable orientation metrics).

The communication device 700 can use the transceiver 702 to also determine a proximity to a cellular, WiFi, Bluetooth®, or other wireless access points by sensing techniques such as utilizing a received signal strength indicator (RSSI) and/or signal time of arrival (TOA) or time of flight (TOF) measurements. The controller 706 can utilize computing technologies such as a microprocessor, a digital signal processor (DSP), programmable gate arrays, application specific integrated circuits, and/or a video processor with associated storage memory such as Flash, ROM, RAM, SRAM, DRAM or other storage technologies for executing computer instructions, controlling, and processing data supplied by the aforementioned components of the communication device 700.

Other components not shown in FIG. 7 can be used in one or more embodiments of the subject disclosure. For instance, the communication device 700 can include a reset button (not shown). The reset button can be used to reset the controller 706 of the communication device 700. In yet another embodiment, the communication device 700 can also include a factory default setting button positioned, for example, below a small hole in a housing assembly of the communication device 700 to force the communication device 700 to re-establish factory settings. In this embodiment, a user can use a protruding object such as a pen or paper clip tip to reach into the hole and depress the default setting button. The communication device 700 can also include a slot for adding or removing an identity module such as a Subscriber Identity Module (SIM) card. SIM cards can be used for identifying subscriber services, executing programs, storing subscriber data, and so forth.

The communication device 700 as described herein can operate with more or less of the circuit components shown in FIG. 7. These variant embodiments can be used in one or more embodiments of the subject disclosure.

The communication device 700 can be adapted to perform the functions of devices of FIGS. 1 and/or 2, the media processor 406, the media devices 408, or the portable communication devices 416 of FIG. 4, as well as the IMS CDs 501-502 and PSTN CDs 503-505 of FIG. 5. It will be appreciated that the communication device 700 can also represent other devices that can operate in systems of FIGS. 1 and/or 2, communication systems 400-500 of FIGS. 4-5 such as a gaming console and a media player. In addition, the controller 706 can be adapted in various embodiments to perform the functions 462-466 and 572-574, respectively.

Upon reviewing the aforementioned embodiments, it would be evident to an artisan with ordinary skill in the art that said embodiments can be modified, reduced, or enhanced without departing from the scope of the claims described below. For example, the dynamic content server 130 can process multiple replay requests of the social media group simultaneously, and provide independent replay packages to group member devices without impacting one another. In one or more embodiments, the subscriber can use her device 116 to manually index through the set of media segments that have been received. As the subscriber views some media segments, while skipping others, the dynamic content server 130 can update the subscriber's preferences based on these choices.

In one or more embodiments, the dynamic content server 130 can make a subscriber's set of media segments and/or requested replay package available for devices that are not affiliated with the subscriber via her social media group. For example, the subscriber can opt in to a program to earn compensation, perhaps in the form of a rewards program, for investing her time and energy in selecting particular replay packages for sharing with other subscribers to the dynamic content server 130. Other embodiments can be used in the subject disclosure.

In one or more embodiments, characteristics of delivering the content can be modified based on a user's updated information and/or preference. For example, if a subscriber uses a different device while traveling (e.g., a smaller or less capable device), then the system can account for this difference by delivering content with lower resolution or using reduced bandwidth. In another example, a user may decide to control her data usage by limiting WiFi accessibility. The preference information can account for the reduced capability by transmitting content using reduced resolution and/or a different data encoding mechanism to achiever reduced data usage.

It should be understood that devices described in the exemplary embodiments can be in communication with each other via various wireless and/or wired methodologies. The methodologies can be links that are described as coupled, connected and so forth, which can include unidirectional and/or bidirectional communication over wireless paths and/or wired paths that utilize one or more of various protocols or methodologies, where the coupling and/or connection can be direct (e.g., no intervening processing device) and/or indirect (e.g., an intermediary processing device such as a router).

Figure 8:
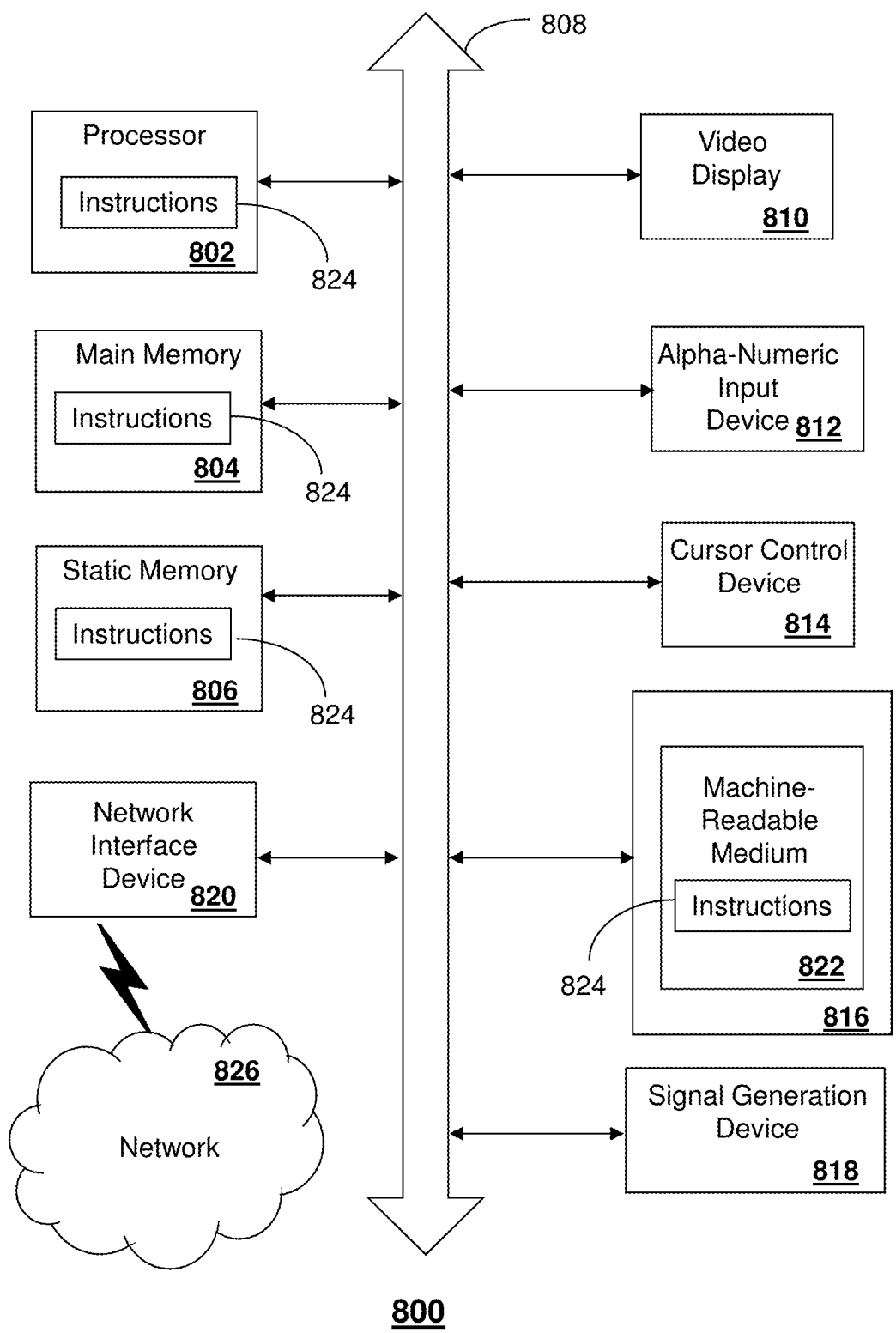
FIG. 8 is a diagrammatic representation of a machine in the form of a computer system within which a set of instructions, when executed, may cause the machine to perform any one or more of the methods described herein.

FIG. 8 depicts an exemplary diagrammatic representation of a machine in the form of a computer system 800 within which a set of instructions, when executed, may cause the machine to perform any one or more of the methods described above. One or more instances of the machine can operate, for example, as the dynamic content server 130, the media processor 106, the mobile communication device 116, the computer device 118, the social media server 180, the subscription server 135, and/or other devices of FIGS. 1-5. In some embodiments, the machine may be connected (e.g., using a network 826) to other machines. In a networked deployment, the machine may operate in the capacity of a server or a client user machine in a server-client user network environment, or as a peer machine in a peer-to-peer (or distributed) network environment.

The machine may comprise a server computer, a client user computer, a personal computer (PC), a tablet, a smart phone, a laptop computer, a desktop computer, a control system, a network router, switch or bridge, or any machine capable of executing a set of instructions (sequential or otherwise) that specify actions to be taken by that machine. It will be understood that a communication device of the subject disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methods discussed herein.

The computer system 800 may include a processor (or controller) 802 (e.g., a central processing unit (CPU)), a graphics processing unit (GPU, or both), a main memory 804 and a static memory 806, which communicate with each other via a bus 808. The computer system 800 may further include a display unit 810 (e.g., a liquid crystal display (LCD), a flat panel, or a solid state display). The computer system 800 may include an input device 812 (e.g., a keyboard), a cursor control device 814 (e.g., a mouse), a disk drive unit 816, a signal generation device 818 (e.g., a speaker or remote control) and a network interface device 820. In distributed environments, the embodiments described in the subject disclosure can be adapted to utilize multiple display units 810 controlled by two or more computer systems 800. In this configuration, presentations described by the subject disclosure may in part be shown in a first of the display units 810, while the remaining portion is presented in a second of the display units 810.

The disk drive unit 816 may include a tangible computer-readable storage medium 822 on which is stored one or more sets of instructions (e.g., software 824) embodying any one or more of the methods or functions described herein, including those methods illustrated above. The instructions 824 may also reside, completely or at least partially, within the main memory 804, the static memory 806, and/or within the processor 802 during execution thereof by the computer system 800. The main memory 804 and the processor 802 also may constitute tangible computer-readable storage media.

Dedicated hardware implementations including, but not limited to, application specific integrated circuits, programmable logic arrays and other hardware devices can likewise be constructed to implement the methods described herein. Application specific integrated circuits and programmable logic array can use downloadable instructions for executing state machines and/or circuit configurations to implement embodiments of the subject disclosure. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the subject disclosure, the operations or methods described herein are intended for operation as software programs or instructions running on or executed by a computer processor or other computing device, and which may include other forms of instructions manifested as a state machine implemented with logic components in an application specific integrated circuit or field programmable gate array. Furthermore, software implementations (e.g., software programs, instructions, etc.) including, but not limited to, distributed processing or component/object distributed processing, parallel processing, or virtual machine processing can also be constructed to implement the methods described herein. It is further noted that a computing device such as a processor, a controller, a state machine or other suitable device for executing instructions to perform operations or methods may perform such operations directly or indirectly by way of one or more intermediate devices directed by the computing device.

While the tangible computer-readable storage medium 822 is shown in an example embodiment to be a single medium, the term "tangible computer-readable storage medium" should be taken to include a single medium or multiple media (e.g., a centralized or distributed database, and/or associated caches and servers) that store the one or more sets of instructions. The term "tangible computer-readable storage medium" shall also be taken to include any non-transitory medium that is capable of storing or encoding a set of instructions for execution by the machine and that cause the machine to perform any one or more of the methods of the subject disclosure. The term "non-transitory" as in a non-transitory computer-readable storage includes without limitation memories, drives, devices and anything tangible but not a signal per se.

The term "tangible computer-readable storage medium" shall accordingly be taken to include, but not be limited to: solid-state memories such as a memory card or other package that houses one or more read-only (non-volatile) memories, random access memories, or other re-writable (volatile) memories, a magneto-optical or optical medium such as a disk or tape, or other tangible media which can be used to store information. Accordingly, the disclosure is considered to include any one or more of a tangible computer-readable storage medium, as listed herein and including art-recognized equivalents and successor media, in which the software implementations herein are stored.

Although the present specification describes components and functions implemented in the embodiments with reference to particular standards and protocols, the disclosure is not limited to such standards and protocols. Each of the standards for Internet and other packet switched network transmission (e.g., TCP/IP, UDP/IP, HTML, HTTP) can represent an example of the state of the art. Such standards are from time-to-time superseded by faster or more efficient equivalents having essentially the same functions. Wireless standards for device detection (e.g., RFID), short-range communications (e.g., Bluetooth®, WiFi, Zigbee®), and long-range communications (e.g., WiMAX, GSM, CDMA, LTE) can be used by computer system 800. In one or more embodiments, information regarding use of services can be generated including services being accessed, media consumption history, user preferences, and so forth. This information can be obtained by various methods including user input, detecting types of communications (e.g., video content vs. audio content), analysis of content streams, and so forth. The generating, obtaining and/or monitoring of this information can be responsive to an authorization provided by the user.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. The exemplary embodiments can include combinations of features and/or steps from multiple embodiments. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Although specific embodiments have been illustrated and described herein, it should be appreciated that any arrangement which achieves the same or similar purpose may be substituted for the embodiments described or shown by the subject disclosure. The subject disclosure is intended to cover any and all adaptations or variations of various embodiments. Combinations of the above embodiments, and other embodiments not specifically described herein, can be used in the subject disclosure. For instance, one or more features from one or more embodiments can be combined with one or more features of one or more other embodiments. In one or more embodiments, features that are positively recited can also be negatively recited and excluded from the embodiment with or without replacement by another structural and/or functional feature. The steps or functions described with respect to the embodiments of the subject disclosure can be performed in any order. The steps or functions described with respect to the embodiments of the subject disclosure can be performed alone or in combination with other steps or functions of the subject disclosure, as well as from other embodiments or from other steps that have not been described in the subject disclosure. Further, more than or less than all of the features described with respect to an embodiment can also be utilized.

Less than all of the steps or functions described with respect to the exemplary processes or methods can also be performed in one or more of the exemplary embodiments. Further, the use of numerical terms to describe a device, component, step or function, such as first, second, third, and so forth, is not intended to describe an order or function unless expressly stated so. The use of the terms first, second, third and so forth, is generally to distinguish between devices, components, steps or functions unless expressly stated otherwise. Additionally, one or more devices or components described with respect to the exemplary embodiments can facilitate one or more functions, where the facilitating (e.g., facilitating access or facilitating establishing a connection) can include less than every step needed to perform the function or can include all of the steps needed to perform the function.

In one or more embodiments, a processor (which can include a controller or circuit) has been described that performs various functions. It should be understood that the processor can be multiple processors, which can include distributed processors or parallel processors in a single machine or multiple machines. The processor can be used in supporting a virtual processing environment. The virtual processing environment may support one or more virtual machines representing computers, servers, or other computing devices. In such virtual machines, components such as microprocessors and storage devices may be virtualized or logically represented. The processor can include a state machine, application specific integrated circuit, and/or programmable gate array including a Field PGA. In one or more embodiments, when a processor executes instructions to perform "operations", this can include the processor performing the operations directly and/or facilitating, directing, or cooperating with another device or component to perform the operations.

The Abstract of the Disclosure is provided with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A server device, comprising:
a memory that stores executable instructions; and
a processor communicatively coupled to the memory, wherein the processor, responsive to executing the executable instructions, performs operations comprising:
receiving a plurality of media streams associated with a media event;
partitioning content of the plurality of media streams into media segments to generate a plurality of media segments associated with the media event;
receiving preference information associated with a first user of first user equipment;
selecting a first set of media segments from the plurality of media segments according to the preference information;
transmitting the first set of media segments to the first user equipment for presentation at the first user equipment;
accessing first social media information associated with a first social media group, wherein the first user is a first member of a first plurality of members of the first social media group;
accessing second social media information associated with a second social media group, wherein the first user is a second member of a second plurality of members of the second social media group;
aggregating the first social media information and the second social media information to generate aggregated social media information for the first user;
receiving, from the first user equipment, a request to change a viewing perspective of the media event from a first viewing perspective to a second viewing perspective;
determining a change in the preference information according to the aggregated social media information and according to the receiving of the request;
modifying the first set of media segments according to the change in preference information to generate a modified set of media segments;
offering the modified set of media segments to the first user equipment while continuing to transmit the first set of media segments to the first user equipment;
receiving an acceptance responsive to the offering of the modified set of media segments to the first user equipment;
ceasing the transmitting of the first set of media segments to the first user equipment responsive to the receiving of the acceptance;
transmitting the modified set of media segments to the first user equipment for presentation at the first user equipment responsive to the receiving of the acceptance;
offering the modified set of media segments to second user equipment of a third member of the first plurality of members of the first social media group responsive to the receiving of the request to change the viewing perspective;

receiving a request from the first user equipment for a replaying of a first media segment of the first set of media segments previously presented at the first user equipment;

responsive to the receiving of the request from the first user equipment for the replaying of the first media segment, opening by the server device a dedicated downlink data channel for providing the first media segment to the first user equipment; and transmitting by the server device the first media segment to the first user equipment via the dedicated downlink data channel for presenting of the first media segment at the first user equipment responsive to the request for the replaying of the first media segment, wherein the accessing of the first social media information associated with the first social media group comprises:

accessing a first comment and a reaction to a second comment from the first social media group; and converting the first comment into an anonymous comment to protect the privacy of a fourth member of the first plurality of members of the first social media group.

2. The server device of claim 1, wherein the operations further comprise:

determining the third member of the first plurality of members of the first social media group according to the first social media information; and transmitting the first set of media segments to the second user equipment associated with the third member for presentation at the second user equipment.

3. The server device of claim 1, wherein the operations further comprise:

transmitting the first media segment to the second user equipment for presenting of the first media segment at the second user equipment, wherein the first user equipment receives a uniform resource identifier for second media information associated with the first social media group in addition to the modified set of media segments.

4. The server device of claim 1, wherein the operations further comprise:

determining, from the first social media information, a plurality of interest characteristics associated with the first plurality of members of the first social media group; and aggregating the plurality of interest characteristics of the first plurality of members of the first social media group to determine an aggregated event interest, wherein the determining of the change in preference information is further according to the aggregated event interest.

5. The server device of claim 1, wherein the operations further comprise:

determining a change in membership of the first plurality of members of the first social media group, wherein the change in preference information is further determined according to the change in membership.

6. The server device of claim 1, wherein the plurality of media streams comprise a plurality of video feeds, a plurality of audio feeds, or a combination thereof, which are associated with the media event, and wherein the first user equipment presents the modified set of media segments by indexing through the media segments.

7. The server device of claim 1, wherein the operations further comprise:

transmitting a first media segment of the plurality of media segments to the first user equipment, wherein the first media segment is not in the first set of media segments;

receiving a request from the first user of the first user equipment to add the first media segment to the first set of media segments; and modifying the first set of media segments according to the request to generate the modified set of media segments.

8. The server device of claim 1, wherein the operations further comprise:

transmitting the modified set of media segments to the second user equipment associated with the third member of the first social media group for presentation at the second user equipment.

9. The server device of claim 1, wherein the operations further comprise:

transmitting the plurality of media segments to the first user equipment, wherein the first user equipment presents the plurality of media segments;

receiving, from the first user equipment, a first set of user selections from the plurality of media segments; and determining the preference information for the first user according to the first set of user selections.

10. The server device of claim 1, wherein the modified set of media segments includes a second set of media segments, wherein the second set of media segments includes media segments at the second viewing perspective and a third viewing perspective, wherein the third viewing perspective is different from the first viewing perspective and the second viewing perspective, and wherein the second viewing perspective includes an overhead view of the media event.

11. The server device of claim 1, wherein the operations further comprise:

closing the dedicated downlink data channel once the first user of the first user equipment has viewed the first media segment.

12. The server device of claim 1, wherein the preference information comprises:

an identification of a first display of the first user equipment for presenting first content associated with a first media stream of the plurality of media streams in a first window and second content associated with a second media stream of the plurality of media streams in a second window, wherein the second window is smaller than the first window; and an identification of a third user equipment of the first user for presenting third content associated with a third media stream of the plurality of media streams.

13. The server device of claim 1, wherein the determining of the change in the preference information is further in accordance with a discovery of a first interest of the first user during the media event and a discarding of a second interest of the first user during the media event.

14. A method, comprising:

receiving, by a system comprising a processor, a first set of media segments from a media server according to preference information associated with a first user of the system, wherein the first set of media segments are selected by the media server from an aggregation of media segments of a plurality of media streams associated with a media event;

presenting, by the system, the first set of media segments;

accessing, by the system, a first social media group, wherein the first user is a first member of a first plurality of members of the first social media group;

accessing, by the system, a second social media group, wherein the first user is a second member of a second plurality of members of the second social media group;

transmitting, by the system, a request to change a viewing perspective of the media event from a first viewing perspective to a second viewing perspective;

receiving, by the system, an offer to receive a second set of media segments while continuing to receive the first set of media segments from the media server, wherein the second set of media segments are generated by the media server by modifying the first set of media segments according to preference information associated with the first user, wherein the preference information is based on first social media information associated with the first social media group, second social media information associated with the second social media group, and the request to change the viewing perspective;

transmitting, by the system, an acceptance to the offer to receive the second set of media segments;

ceasing, by the system, the receiving of the first set of media segments from the media server responsive to the transmitting of the acceptance to the offer to receive the second set of media segments;

receiving, by the system, the second set of media segments responsive to the transmitting of the acceptance to the offer to receive the second set of media segments;

presenting, by the system, the second set of media segments;

receiving, by the system, a user request for replaying of a first media segment of the first set of media segments previously presented at the system;

transmitting, by the system, a replay request to the media server according to the user request;

receiving, by the system, the first media segment from the media server via a dedicated downlink data channel that is opened by the media server in response to the replay request; and presenting, by the system, the first media segment that is received, wherein the second set of media segments are offered by the media server to a second system comprising a second processor responsive to the transmitting of the request to change the viewing perspective, wherein the second system is associated with a third member of the first plurality of members of the first social media group, and wherein the accessing of the first social media group comprises:
  accessing a first comment and a reaction to a second comment from the first social media group; and
  converting the first comment into an anonymous comment to protect the privacy of a fourth member of the first plurality of members of the first social media group.

15. The method of claim 14, further comprising:
receiving, by the system, the aggregation of media segments from the media server;
presenting, by the system, the aggregation of media segments;
receiving, by the system, a first set of user selections from the aggregation of media segments; and
transmitting, by the system, the first set of user selections to the media server, wherein the media server determines the first set of media segments for the first user according to the first set of user selections.

16. The method of claim 14, wherein the media server transmits the first media segment to the second system associated with the third member of the first plurality of members of the first social media group responsive to the replay request.

17. The method of claim 14, further comprising:
receiving, by the system, a uniform resource identifier for second media information associated with the first social media group; and
presenting, by the system, a graphical element for accessing the second media information via the uniform resource identifier.

18. The method of claim 14, wherein the media server closes the dedicated downlink data channel once the first user has viewed the first media segment via the system.

19. A non-transitory machine-readable storage medium, comprising executable instructions that, when executed by a processor, facilitate performance of operations, comprising:
partitioning content of a plurality of media streams into media segments to generate a plurality of media segments associated with a media event;
determining a first set of media segments from the plurality of media segments according to first social media information associated with a first social media group, wherein the first social media information includes a first comment and a reaction to a second comment;
transmitting the first set of media segments to first user equipment of a first member of the first social media group;
detecting a change in membership of the first social media group;
accessing second social media information associated with a second social media group, wherein the first member of the first social media group is a second member of the second social media group;
aggregating the first social media information and the second social media information to generate aggregated social media information;
receiving, from the first user equipment, a request to change a viewing perspective of the media event from a first viewing perspective to a second viewing perspective;
updating the first set of media segments according to the change in membership of the first social media group, the aggregated social media information, and the request to change the viewing perspective to generate a modified set of media segments;
offering the modified set of media segments to the first user equipment while continuing to transmit the first set of media segments to the first user equipment;
receiving an acceptance responsive to the offering of the modified set of media segments to the first user equipment;
ceasing the transmitting of the first set of media segments to the first user equipment responsive to the receiving of the acceptance;
transmitting the modified set of media segments to the first user equipment for presentation at the first user equipment responsive to the receiving of the acceptance;
offering the modified set of media segments to second user equipment of a third member of the first social media group responsive to the receiving of the request to change the viewing perspective;

receiving a request from the first user equipment for a replaying of a first media segment of the modified set of media segments previously presented at the first user equipment;

responsive to the receiving of the request from the first user equipment for the replaying of the first media segment, opening a dedicated downlink data channel for providing the first media segment to the first user equipment;

transmitting the first media segment to the first user equipment via the dedicated downlink data channel for presenting the first media segment at the first user equipment; and converting the first comment into an anonymous comment to protect the privacy of a fourth member of the first social media group.

20. The non-transitory machine-readable storage medium of claim 19, wherein the operations further comprise:

closing the dedicated downlink data channel once the first member has viewed the first media segment via the first user equipment.

* * * * *